(12) United States Patent
Flatscher et al.

(10) Patent No.: US 12,191,774 B2
(45) Date of Patent: Jan. 7, 2025

(54) BIDIRECTIONAL POWER SUPPLY SYSTEM FOR POWERING A BATTERY MANAGEMENT SYSTEM OF AN ELECTRIC VEHICLE

(71) Applicant: SAMSUNG SDI CO., LTD., Yongin-si (KR)

(72) Inventors: Matthias Flatscher, Graz (AT); Peter Kurcik, Nikolai Im Sausal (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 17/845,330

(22) Filed: Jun. 21, 2022

(65) Prior Publication Data

US 2022/0407427 A1    Dec. 22, 2022

(30) Foreign Application Priority Data

Jun. 22, 2021 (EP) .................................. 21180915
Jun. 9, 2022 (KR) ...................... 10-2022-0070267

(51) Int. Cl.
*B60R 16/02*     (2006.01)
*B60L 50/60*     (2019.01)
(Continued)

(52) U.S. Cl.
CPC ......... *H02M 3/33584* (2013.01); *B60L 50/60* (2019.02); *B60L 58/18* (2019.02);
(Continued)

(58) Field of Classification Search
CPC ... H02J 9/06; H02J 7/007; G06F 1/26; H02M 7/2176; H02M 5/2573
See application file for complete search history.

(56) References Cited

U.S. PATENT DOCUMENTS

2007/0139975 A1    6/2007  Yamauchi et al.
2018/0153679 A1*   6/2018  Hebert ............. A61B 17/12118
(Continued)

FOREIGN PATENT DOCUMENTS

CN         104827921 A    8/2015
EP           1801960 A2   6/2007
(Continued)

OTHER PUBLICATIONS

Extended European Search Report for EP 211809157, Nov. 19, 2021
(Continued)

*Primary Examiner* — Elim Ortiz
(74) *Attorney, Agent, or Firm* — Lee IP Law, P.C.

(57) ABSTRACT

A bidirectional power supply system receives power from a low voltage (LV) primary power supply, providing power to a control unit of a LV board net in a first mode of operation. A high voltage (HV) board net is coupled to a HV traction battery. A DC-DC converter, in the first mode, transfers energy from the LV board net to the HV board net to power components of the HV board net via the primary power supply, and, in a second mode of operation, transfers energy from the HV board net to the LV board net to power the control unit via the traction battery. The bidirectional power supply system includes a measurement element to detect whether the primary power supply is lost, and a switching element to switch operation of the DC-DC converter from the first mode to the second mode, when the primary power supply is lost.

18 Claims, 2 Drawing Sheets

(51) Int. Cl.
    *B60L 58/18*     (2019.01)
    *B60R 16/03*     (2006.01)
    *B60R 16/033*     (2006.01)
    *H02J 7/00*     (2006.01)
    *H02M 3/335*     (2006.01)

(52) U.S. Cl.
    CPC ......... *H02J 7/0063* (2013.01); *H02J 7/00711* (2020.01); *B60L 2210/10* (2013.01)

(56) References Cited

U.S. PATENT DOCUMENTS

| | | | |
|---|---|---|---|
| 2018/0186241 A1 | 7/2018 | Harvey et al. | |
| 2018/0334118 A1* | 11/2018 | Masui | H02J 7/00 |
| 2019/0190294 A1* | 6/2019 | Sato | B60L 58/12 |
| 2020/0317085 A1 | 10/2020 | Hofer | |
| 2020/0335991 A1 | 10/2020 | Tsukamoto et al. | |
| 2021/0138930 A1 | 5/2021 | Bernhardt et al. | |

FOREIGN PATENT DOCUMENTS

| | | | | |
|---|---|---|---|---|
| EP | 2722137 A2 * | 4/2014 | ............ | B25J 9/1682 |
| EP | 3722137 A1 * | 10/2020 | ................ | B60L 1/00 |
| WO | WO 2018/153679 A1 | 8/2018 | | |

OTHER PUBLICATIONS

European Office Action dated Jun. 6, 2024, of the corresponding European Patent Application No. 21180915.7.
European Office Action dated Mar. 10, 2023.
European Office Action dated Dec. 21, 2023, of the corresponding European Patent Application No. 21180915.7.

\* cited by examiner

BIDIRECTIONAL POWER SUPPLY SYSTEM FOR POWERING A BATTERY MANAGEMENT SYSTEM OF AN ELECTRIC VEHICLE

CROSS-REFERENCE TO RELATED APPLICATIONS

This application claims priority to and the benefit of European Patent Application No. 21180915.7, filed on Jun. 22, 2021, in the European Intellectual Property Office, and Korean Patent Application No. 10-2022-0070267, filed on Jun. 9, 2022, in the Korean Intellectual Property Office, which are incorporated by reference herein in their entireties.

BACKGROUND

1. Field

Embodiments relate to a bidirectional power supply system for powering a battery management system of an electric vehicle.

2. Description of the Related Art

In the recent years, vehicles for transportation of goods and peoples have been developed using electric power as a source for motion. Such an electric vehicle is an automobile that is propelled by an electric motor, using energy stored in rechargeable batteries. An electric vehicle may be solely powered by batteries or may be a form of hybrid vehicle powered by for example a gasoline generator. Furthermore, the vehicle may include a combination of electric motor and combustion engine. In general, an electric-vehicle battery, EVB, or traction battery is a battery used to power the propulsion of battery electric vehicles, BEVs. Electric-vehicle batteries differ from starting, lighting, and ignition batteries because they are designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g., cylindrical or rectangular, depends on the battery's intended purpose. Lithium-ion (and similar lithium polymer) batteries, widely known via their use in laptops and consumer electronics, dominate the most recent group of electric vehicles in development.

Rechargeable batteries may be used as a battery module formed of a plurality of unit battery cells coupled in series and/or in parallel so as to provide a high energy density, in particular for motor driving of a hybrid vehicle. That is, the battery module is formed by interconnecting the electrode terminals of the plurality of unit battery cells depending on a required amount of power and in order to realize a high-power rechargeable battery.

Battery modules can be constructed either in block design or in modular design. In block designs each battery is coupled to a common current collector structure and a common battery management system and the unit thereof is arranged in a housing. In modular designs, pluralities of battery cells are connected to form submodules and several submodules are connected to form the battery module. In automotive applications, battery systems often consist of a plurality of battery modules connected in series for providing a desired voltage. Therein, the battery modules may include submodules with a plurality of stacked battery cells, each stack including cells connected in parallel that are connected in series (XpYs) or multiple cells connected in series that are connected in parallel (XsYp).

A battery pack is a set of any number of (preferably identical) battery modules. They may be configured in a series, parallel or a mixture of both to deliver the desired voltage, capacity, or power density. Components of battery packs include the individual battery modules, and the interconnects, which provide electrical conductivity between them.

SUMMARY

Embodiments are directed to a bidirectional power supply system for powering a control unit of an electric vehicle, the bidirectional power supply system including: a low voltage board net that includes the control unit, the low voltage board net being adapted to supply power from a low voltage primary power supply to the control unit in a first mode of operation; a high voltage board net, the high voltage board net being configured to receive power from a high voltage traction battery of the electric vehicle; a bidirectional DC-DC converter, in which a low voltage side is coupled to the low voltage board net, and a high voltage side is coupled to the high voltage board net; a measurement element adapted to detect whether power from the low voltage primary power supply is lost; and a switching element adapted to switch operation of the bidirectional DC-DC converter from the first mode to a second mode of operation, if loss of the primary power supply is detected. The bidirectional DC-DC converter is adapted to, in the first mode, transfer energy from the low voltage board net to the high voltage board net, to power components of the high voltage board net via the primary power supply. The DC-DC converter is adapted to, in the second mode, transfer energy from the high voltage board net to the low voltage board net, to power the control unit via the high voltage traction battery.

The measurement element includes a pulse-width modulation detector arranged at the high voltage board net, the pulse-width modulation detector being adapted to analyze a pulse-width modulation signal present on the high voltage side of the bidirectional DC-DC converter, and to detect, based on the analyzed pulse-width modulation signal, whether the primary power supply is lost.

The pulse-width modulation detector is further adapted as a switching element that is adapted to switch operation of the bidirectional DC-DC converter to the second mode when it detects that the primary power supply is lost.

The bidirectional power supply system includes at least one of: at least one capacitor adapted to supply the measurement element with power, in case of loss of the primary power supply, for long enough to allow the measurement element to detect that the primary power supply is lost; or at least one capacitor adapted to supply the switching element with power for long enough to allow the switching element to switch operation of the bidirectional DC-DC converter to the second mode.

The bidirectional power supply system includes a control unit arranged at the low voltage board net. The control unit is adapted to generate a pulse-width modulation signal during the first mode. The control unit is adapted to detect that the primary power supply is lost.

The control unit is adapted to stop the generation of the pulse-width modulation signal at the low voltage board net when it detects that the primary power supply is lost.

The bidirectional power supply system includes a pulse-width modulation signal generator on the high voltage board net, the pulse-width modulation signal generator being adapted to generate a pulse-width modulation signal in the second mode.

The bidirectional power supply system includes a timer means adapted to shut down operation in the second mode after a predetermined time span.

The timer means includes a timer circuit adapted to shut down operation in the second mode after the predetermined time span.

The timer means includes a control unit adapted to shut down operation in the second mode after the predetermined time span via a respective control signal.

The bidirectional power supply system includes a control element adapted to provide a cell voltage-dependent adjustment of a frequency and/or a width of the pulse-width modulation signal during the second mode.

The bidirectional power supply system includes a current limiting means, on the low voltage board net, adapted to limit current of switching circuitry.

Embodiments are also directed to an electric vehicle, including a bidirectional power supply system according to an embodiment.

The low voltage board net and the high voltage board net are galvanically isolated via a transformer in the bidirectional DC-DC converter. The high voltage traction battery powers the low voltage board net in the second mode.

BRIEF DESCRIPTION OF THE DRAWINGS

Features will become apparent to those of skill in the art by describing in detail example embodiments with reference to the attached drawings in which.

DETAILED DESCRIPTION

Figure 1A:
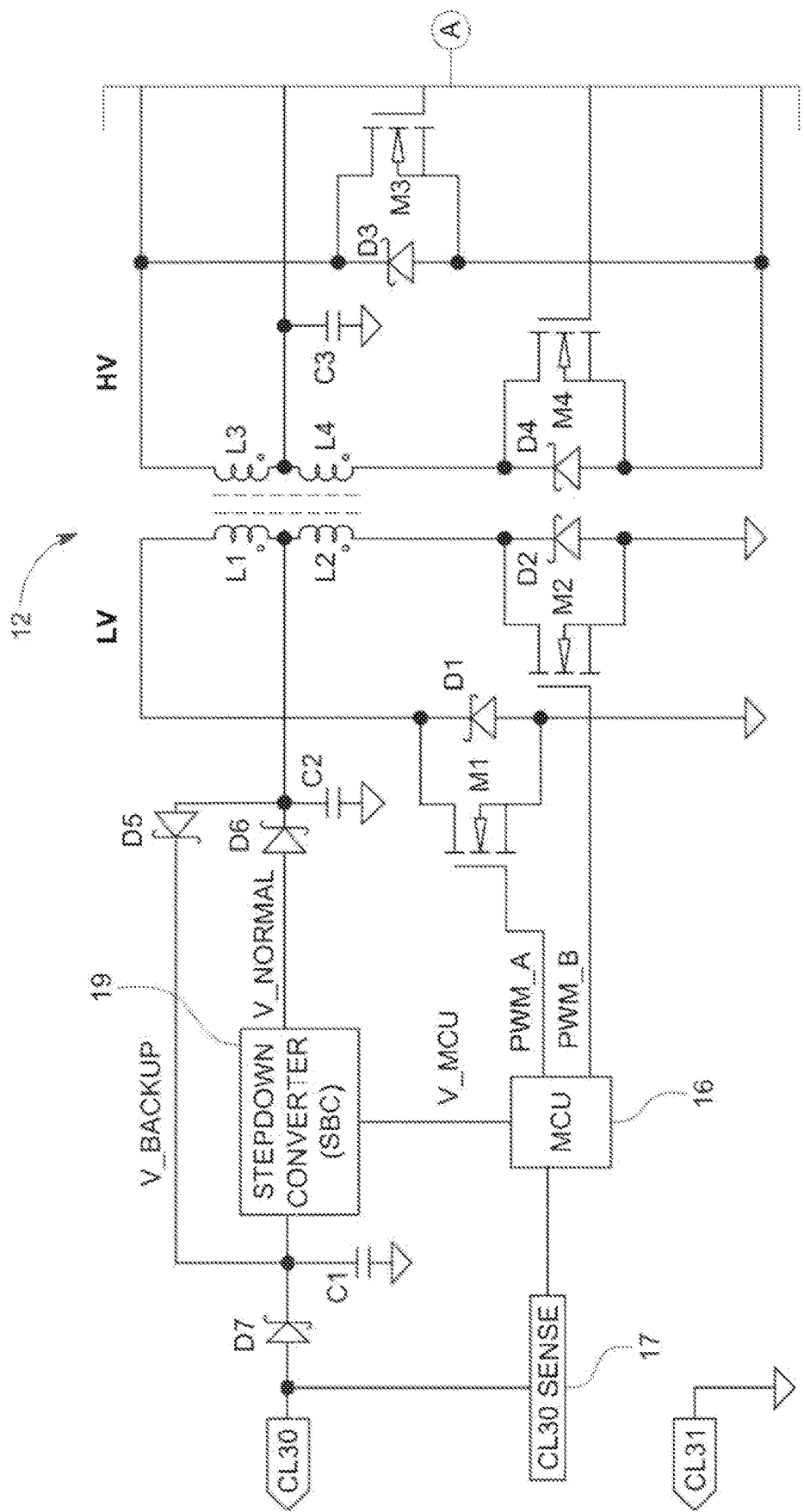
FIGS. 1A and 1B illustrate schematics of a bidirectional power supply system according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

As used herein, the term "and/or" includes any and all combinations of one or more of the associated listed items. Further, the use of "may" when describing embodiments of the present disclosure refers to "one or more embodiments of the present disclosure." As used herein, the terms of a singular form may include plural forms unless the context clearly indicates otherwise. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values. Further, if the term "substantially" is used in combination with a feature that could be expressed using a numeric value, the term "substantially" denotes a range of +/−5% of the value centered on the value.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

The electronic or electric devices and/or any other relevant devices or components described herein may be implemented utilizing any suitable hardware, firmware, software, or a combination of software, firmware, and hardware. For example, an application-specific integrated circuit (ASIC) as a custom chip realization may be used while a specific firmware may be provided for the ASIC, i.e., flashed on a microcontroller to communicate with the ASIC and make use of it. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g., on a PCB or another kind of circuit carrier. The conducting elements may include metallization, e.g., surface metallizations and/or pins, and/or may include conductive polymers or ceramics. Further, electrical energy may be transmitted via wireless connections, e.g., using electromagnetic radiation and/or light.

Also, it will be recognized that the functionality of various computing devices may be combined or integrated into a single computing device, or the functionality of a particular computing device may be distributed across one or more other computing devices.

Figure 1B:
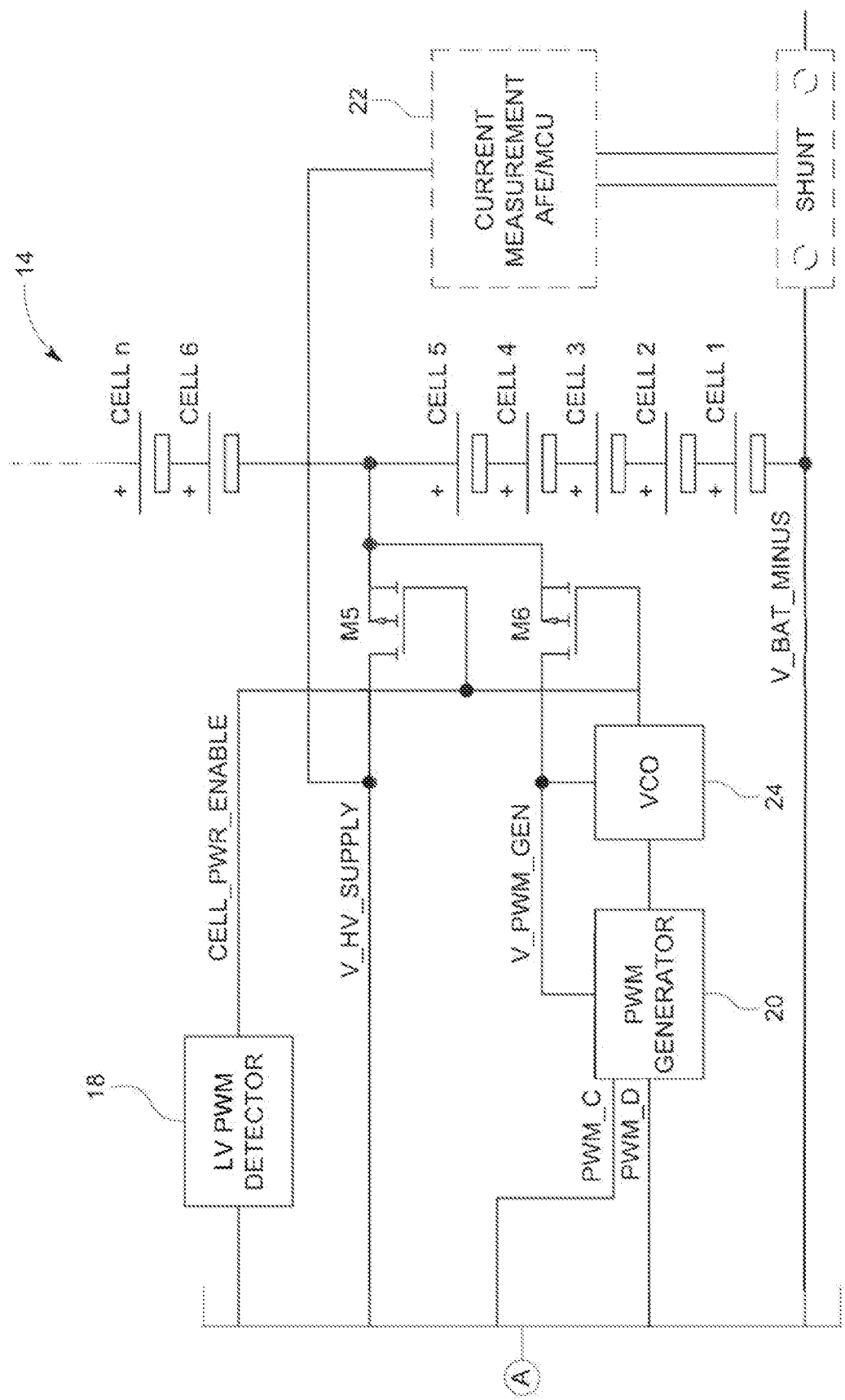

FIGS. 1A and 1B show schematically a circuit diagram of a bidirectional power supply system according to an example embodiment, based on a push-pull topology.

FIGS. 1A and 1B show a low voltage (LV) board net at the left-hand side of the diagram and a high voltage (HV) board net at the right-hand side of the diagram.

According to the present example embodiment, a bidirectional DC-DC converter utilizing a transformer 12 is adapted to transfer energy between the LV board net and the HV board net in both directions. Only the transformer 12 of the DC-DC converter is shown, but the DC-DC converter may include further elements.

The LV board net includes connections to an LV primary power supply, which is not shown in detail in the drawings, but connections CL30 and CL31 to a positive electrode and a negative electrode of the LV primary power supply are shown.

The HV board net is connected to an HV battery 14, which is the traction battery of the electric vehicle serving the propulsion of the electric vehicle. As can be seen in the drawings, the HV battery 14 includes multiple cells 1 to n.

In a first mode of operation, i.e., "normal operation", the LV primary power supply may supply power to the components of the LV board net, including a microcontroller unit (MCU) 16 which is part of a battery management system (BMS). As described in detail below, a second mode of operation may have power supplied by the HV battery 14.

The MCU may reside on the BMS, i.e., it may be the main/only MCU on the BMS, or a dedicated MCU only enabling the functionality according to the present example embodiment may be used.

The LV primary power supply may further supply power to components of the HV board net, in particular an LV pulse-width modulation signal detector (PWM detector) 18, wherein the LV prevalent on the LV board net is transformed via the bidirectional DC-DC converter to a galvanically isolated voltage LV or HV on the HV board net.

In the first mode of operation, V_NORMAL (e.g., 6 V) is provided by a step-down converter 19 (which may be implemented by means of a system basis chip (SBC)), and interleaved PWM (including signals PWM_A and PWM_B) is provided by the MCU 16, the interleaved PWM controlling switching of metal oxide semiconductor field effect transistors (MOSFETs) M1 and M2.

In the case that the transformer 12 has a transformer ratio of 1:1, a voltage of about V_NORMAL minus 2 times the diode drop will be present at V_HV_SUPPLY node (see FIG. 1B). This voltage then powers the operation of current sensing circuitry (e.g., current measurement analog front-end (AFE)/MCU 22) on the HV side, and the LV PWM detector 18.

Note that diodes D3 and D4 in FIG. 1A may be omitted, e.g., if the diodes of the MOSFETs can handle the load.

Should the LV primary power supply be lost, e.g., by losing power at the connection CL30, the bidirectional power supply system switches to the second mode of operation in which power is supplied by the HV battery 14.

Such a loss of the primary power supply is detected by the LV PWM detector 18 (see FIG. 1B), which analyzes the signal present on the HV side of the transformer 12 and switches operation of the bidirectional DC-DC converter to the second mode (thus enabling the power supply from the HV battery 14, e.g., cells 1 to 5 of the HV battery 14) as soon as it detects that the LV side is not present on the transformer 12.

Such switching is performed via the LV PWM detector 18 activating MOSFET M5 (which is arranged on the HV board net, and which in turn enables the power supply via the cells 1 to 5 of the HV battery 14 to the HV side) and activating MOSFET M6 (which is also arranged on the HV board net, and which enables the generation of the PWM via PWM generator 20 on the HV side).

From this point onwards, the transformer 12 is operated in the second mode of operation, i.e., in the HV to LV direction.

Thus, in the second mode of operation, part of the cells of the HV battery 14 of the electric vehicle are used as a backup power supply, supplying power to components of the low voltage board net, in particular the BMS/MCU.

Further, the MCU 16 (which generates the PWM signals on the LV side) also detects the CL30 drop, i.e., the loss of the primary power supply, via a sensing element 17. The MCU 16 then immediately stops the generation of the PWM_A and PWM_B signals.

Capacitors C1, C2, and C3 (see FIG. 1A) are provided to store enough energy to power the necessary components long enough to allow switching to the second mode of operation, e.g., to allow the LV PWM detector 18 to notice the absence of operating the transformer 12 from the LV side, and to activate MOSFETs M5, M6 (to thus enable the power supply via the HV battery 14 and the generation of the PWM on the HV side, respectively, as discussed above).

In the second mode of operation, the PWM generator 20 takes over the generation of PWM signals from the MCU 16, the PWM generator 20 generating signals PWM_C and PWM D on the HV side.

The second mode of operation may be time limited, as it may unbalance the HV battery 14 (e.g., by not drawing the power from a whole cell stack, but only from, e.g., cells 1 to 5). Therefore, a timer circuit may be implemented to shut down the operation in the second mode after a certain time. In another implementation, the current measurement AFE/MCU 22 (which may be provided on the HV board net, as shown in FIG. 1B in dashed lines) may be adapted to shut down the DC-DC converter by means of digital outputs.

As the cell voltage of the cells of the HV battery 14 depends on state of charge (worst-case range for 5 cells is about 10 to 21 V), the PWM width or frequency should be altered to not exceed the transformer ET product for the given voltage. Generally, the frequency may be increased, or the pulse width may be decreased when the voltage increases. In the example embodiment shown in FIGS. 1A and 1B, a voltage-controlled oscillator (VCO) 24 provides cell voltage-dependent frequency adjustment.

Thus, according to the present example embodiment, a bidirectional redundant power supply is provided to supply the shunt-based current measurement circuitry (LV to HV direction) in normal mode, and operating backwards (HV to LV direction) when outage of LV power supply CL30, e.g., outage of vehicle power supply, is detected.

By way of summation and review, for meeting the dynamic power demands of various electrical consumers connected to a battery system, a static control of battery power output and charging may not be sufficient. Thus, steady exchange of information between the battery system and the controllers of the electrical consumers may be called for. This information may include the battery system's actual state of charge (SoC), potential electrical performance, charging ability, and internal resistance, as well as actual or predicted power demands or surpluses of the consumers. Therefore, a battery system may include a battery management system (BMS) for obtaining and processing such information on system level, and/or may include a plurality of battery module managers (BMMs), which are part of the system's battery modules and obtain and process relevant information on module level. The BMS may measure a system voltage, a system current, a local temperature at different places inside a system housing, and an insulation resistance between live components and the system housing. Additionally, the BMMs may measure individual cell voltages and temperatures of battery cells in a battery module.

Thus, a BMS/BMU (Battery Management Unit) may be provided for managing the battery pack, such as by protecting the battery from operating outside its safe operating area, monitoring its state, calculating secondary data, reporting that data, controlling its environment, authenticating it, and/or balancing it.

In general, an electric vehicle may have a high voltage (HV) board net, including the traction battery supplying the propulsion components with power, and a low voltage (LV) board net, including a low voltage battery supplying power to electronic consumers of the vehicle. The BMS of the traction battery may be arranged at the LV board net and may be driven by the low voltage battery. The LV board net and the HV board net may be galvanically isolated from one another via a DC-DC-converter, which transfers energy from the LV board net to the HV board net so that components of the HV board net can be powered by the low voltage battery of the LV board net as well. The low voltage battery, as the primary power supply of the LV board net may be, e.g., a common lead acid battery of the vehicle. The poles of the low voltage battery may correspond to the connections CL30 and CL31 for the positive pole and the negative pole, respectively.

During operation of the vehicle, it may happen that the CL30, i.e., the connection to the positive pole, is unintentionally lost, leaving the BMS without power. Said connection loss may also lead to an opening of main relays, which galvanically disconnect the cells of the battery from the HV board net, which may damage the contact surfaces of the relays. In this case, the BMS may not have information about the current going through these relays at the time when the contactors opened, and therefore no information may be derived about any actual physical damage to the contact surfaces.

As a backup power supply for the BMS, the traction battery of the electric vehicle may be used, which, in case of an HV battery (>60 V), may be galvanically isolated from the LV board net.

In general, such backup power supply could be implemented as a separate functional block which is idle during normal operation and starts up only when the main power supply is lost. Such a configuration of a BMS may use a shunt-based current measurement located mostly on the negative side of the battery cell stack or on the negative output of the battery. A shunt-based measurement circuit may include a current measuring resistor of a low impedance. This measurement circuit may be galvanically isolated from the rest of the LV-based BMS.

To provide galvanic isolation, a DC-DC converter may be used, which utilizes a transformer to transfer energy from the LV board net to the HV board net. Such a transformer may be the most expensive part of the power supply.

As described above, an example embodiment provides a bidirectional power supply system.

In an example embodiment, the bidirectional power supply system for powering a battery management system of an electric vehicle is connected to a low voltage (LV) primary power supply adapted to power a control unit, in particular the battery management system (BMS), in a first mode of operation, the control unit (in particular the BMS) being a component of a low voltage board net. The bidirectional power supply system is connected to a high voltage (HV) traction battery of the electric vehicle using a high voltage board net. A bidirectional DC-DC converter is adapted to, in the first mode of operation, transfer energy from the low voltage board net to the high voltage board net to power components of the high voltage board net via the primary power supply. The DC-DC converter is further adapted to, in a second mode of operation, transfer energy of the high voltage board net to the low voltage board net to power the control unit (BMS), and possibly further components of the low voltage board net, via the high voltage traction battery in case of loss of the primary power supply. The bidirectional power supply system further includes a measurement element adapted to detect whether the primary power supply is lost, and a switching element adapted to switch operation of the DC-DC converter from the first mode to the second mode, if loss of the primary power supply is detected.

The DC-DC converter includes a transformer that is adapted to transfer energy between the LV board net and the HV board net in both directions. The control unit may be the BMS. Also, the control unit may be part of the BMS. The control unit may be referred to herein as the BMS.

During normal operation, the primary power supply supplies the BMS, and possibly further or all components of the LV board net, with power/energy. The primary power supply may be, e.g., a 12, 24, or 48 V power supply. Furthermore, the primary power supply may supply components of the HV board net with power/energy, wherein energy is transferred from the LV board net via the bidirectional DC-DC converter to the HV board net. For example, the DC-DC converter may transform the LV of the primary power supply to an LV or to an HV suitable for powering components of the HV board net. Thus, components of the HV board net may be powered by an LV as well (e.g., by the LV of the primary power supply or by suitably transformed LV). In this first mode of operation, a pulse-width modulation signal generator (PWM generator) may be driven by the LV board system and triggered by the BMS.

Should the primary power supply be lost, e.g., by losing a connection of the primary power supply to the LV board net as explained above, the second mode of operation may be called for. The bidirectional DC-DC converter is adapted to transfer energy in both directions, i.e., to also transfer energy from the HV board net to the LV board net. Thus, in the second mode of operation, the HV traction battery of the electric vehicle is used as a backup power supply to power components of the low voltage board net, in particular the BMS. In an implementation, only a part of the battery cells or cell stacks of the HV traction battery are used as a backup power supply in the second mode. To detect whether the primary power supply is lost, a measurement element is provided. Further a switching element is provided to switch operation of the DC-DC converter from the first mode to the second mode if a loss of the primary power supply is detected. The measurement element and the switching element may be the same element, e.g., they may be realized by a PWM detector. The measurement element and/or the switching element may form part of the BMS. The measurement element and/or the switching element may be part of the HV board net. The system may form part of a push-pull converter.

Thus, using the measurement and switching elements, the system may automatically switch to the HV battery as a backup power supply if the primary LV battery fails to deliver power/energy (e.g., in the case that power at CL30 is unintentionally lost) to thus provide an uninterrupted power supply to the BMS and ensure the working of the BMS. The BMS may receive information about a level of current going through relays at the time that contactors are opened, so that information can be derived about any physical damage to contact surfaces. In addition, the use of the DC-DC converter, in particular its transformer, is cost efficient compared to using a second independent transformer for transferring energy from HV to LV.

According to an example embodiment, the measurement element includes a PWM detector arranged at the HV board net, i.e., at the high voltage side of the DC-DC converter/transformer. The PWM detector is adapted to analyze a pulse-width modulation signal present on the HV side of the DC-DC converter, and to detect, based on the analyzed signal, whether the primary power supply is lost. Thus, the PWM detector may work as the measurement element. The signal analysis may determine that the low voltage side is not switching/operating the transformer, which may be interpreted as a loss of the primary power supply. According to another example embodiment, the PWM detector may be adapted to switch operation of the DC-DC converter to the second mode as soon as it detects that that the primary power supply is lost. Thus, the PWM detector may work as the switching element as well. Therefore, if the analysis of the pulse-width modulation signal present on the HV side of the DC-DC converter/transformer results in the conclusion that the primary power supply is lost, the PWM detector may switch the operational mode so that the LV board net (in particular, the BMS) is supplied by the HV traction battery. The PWM detector may thus provide an efficient and timely response to a loss of the primary power supply.

According to a further example embodiment, at least one capacitor is provided which is adapted to supply the measurement element with power, in case of loss of the primary power supply, long enough to allow the measurement element to detect that the primary power supply is lost. Also, the same or another capacitor may be provided, and adapted to supply the switching element long enough to allow the switching element to switch operation of the DC-DC converter to the second mode. Thus, the at least one capacitor may be adapted to supply the PWM detector with power in case of loss of the primary power supply long enough to allow the PWM detector to detect that the primary power supply is lost, and to switch operation of the bidirectional DC-DC converter to the second mode. Thus, the at least one capacitor may work as an interim power supply for the measurement and switching element after loss of the primary power supply and before switching to the HV board net and its associated traction battery as a backup power supply. The at least one capacitor may be charged during normal operation, e.g., during the first mode of operation, via the primary power supply. Such a capacitor may help ensure reliable switching to the second mode.

According to an example embodiment, the bidirectional power supply system includes a control unit for generating a pulse-width modulation signal during the first mode of operation. The control unit may be arranged at the low voltage board net, i.e., at the low voltage side of the DC-DC converter/transformer. The control unit may be adapted to detect that the primary power supply is lost. The control unit may be part of the BMS or it may be a separate control unit, e.g., a microcontroller unit (MCU). In general, it is the control unit's purpose to generate one or more PWM signals during normal operation of the system, i.e., during the first mode of operation. The control unit may detect the loss of primary power, e.g., by detecting that the connection CL30 is lost or has no power. Thus, the loss of the primary power supply may be detected on the LV side of the DC-DC converter/transformer (as well), allowing for respective measures to be taken. According to an example embodiment, the control unit may be further adapted to stop the generation of the pulse-width modulation signal at the low voltage board net as soon as it detects that the primary power supply is lost. Thus, if the control unit detects the loss of primary power, it may immediately stop the generation of the PWM signal(s) at the LV board net, thus enabling switching the operation to the second mode. Then, in the second mode of operation, the PWM signal(s) may be generated by a PWM generator on the HV side.

As described above, according to an example embodiment, the bidirectional power supply system includes a PWM generator on the HV board net, the PWM generator being adapted to generate PWM signals in the second mode of operation. This PWM generator may take over the operation of the above-discussed control unit with respect to generating the PWM signals when the system switches to the second mode of operation. This way, the PWM signal generation, and therefore the proper working of the system, may be ensured in the second mode of operation as well.

According to an example embodiment, the bidirectional power supply system may include a timer means adapted to shut down the operation in the second mode after a predetermined time span. The timer means may be or include a timer circuit adapted to shut down the operation in the second mode after the predetermined time span. In another implementation, the timer means may include a control unit, e.g., a microcontroller unit (MCU), adapted to shut down the operation in the second mode after the predetermined time span via a respective control signal. The control unit may be part of the BMS. It may be advantageous to provide a limit for the operation in the second mode, i.e., the HV to LV direction, to limit the load on the HV battery. For example, if in the second mode power is drawn not from all of the cells of the HV battery but only from a part of the cell stack, the whole HV cell stack may become unbalanced.

According to an example embodiment, the bidirectional power supply system includes a control element to provide a cell voltage-dependent adjustment of the frequency and/or the width of the PWM signal during the second mode of operation. The control element may be arranged on the HV board net. The control element may include a voltage-controlled oscillator (VCO) for cell voltage-dependent frequency adjustment. As the cell voltage of the battery cells of the HV traction battery depends on the state of charge of the cells, the PWM width or frequency may be altered to not exceed the transformer ET product for the given voltage. Thus, either the frequency may be increased or the pulse width of the PWM signal may be decreased when the voltage increases. Accordingly, either the frequency may be decreased or the pulse width of the PWM signal may be increased when the voltage decreases.

According to an example embodiment, the bidirectional power supply system may include a means for current limitation of the switching circuitry, e.g., arranged on the low voltage board net. The switching circuitry may include one or more metal oxide semiconductor field effect transistors (MOSFETs) working as switches and actuated by, e.g., one or more of the above-discussed control units, e.g., by the BMS. For example, the switching circuitry may include push-pull switching MOSFETs and/or snubber and/or voltage clamping circuitry, the snubber allowing for suppression of voltage transients in the electrical circuits. Such a current limitation may prevent excessively high currents that could compromise the system. Such means for current limitation may also or alternatively be provided on the HV board net side to prevent damage of the HV switching elements (MOSFETs) due to stress from overcurrent.

According to another example embodiment, an electric vehicle including a bidirectional power supply system, as disclosed above, is provided. The electric vehicle may include the low voltage board net and the high voltage board net that are galvanically isolated by the bidirectional DC-DC converter. The high voltage traction battery may power the low voltage board net in the second mode of operation. The low voltage board net and the high voltage board net may be considered to form part of the bidirectional power supply system.

As described above, embodiments relate to a bidirectional power supply system for powering one or more components of a low voltage board net, e.g., a battery management system, of an electric vehicle, and to an electric vehicle including such a bidirectional power supply system. Embodiments may provide a bidirectional power supply system for a low voltage board net of an electric vehicle that allows for a reliable power supply.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

REFERENCE SIGNS 12 transformer
14 high voltage battery
16 BMS/MCU
17 CL30 sensor
18 LV PWM detector
19 SBC
20 PWM generator on HV side
24 VCO

What is claimed is:

1. A bidirectional power supply system for powering a control unit of an electric vehicle, the bidirectional power supply system comprising:
a low voltage board net that includes the control unit, the low voltage board net being adapted to supply power from a low voltage primary power supply to the control unit in a first mode of operation corresponding to normal operation;
a high voltage board net, the high voltage board net being configured to receive power from a high voltage traction battery of the electric vehicle;
a bidirectional DC-DC converter, in which a low voltage side is coupled to the low voltage board net, and a high voltage side is coupled to the high voltage board net;
a measurement element adapted to detect whether power from the low voltage primary power supply is lost; and
a switching element adapted to switch operation of the bidirectional DC-DC converter from the first mode to a second mode of operation, in accordance with detection of a loss of the low voltage primary power supply, wherein:
the bidirectional DC-DC converter is adapted to, in the first mode, transfer energy from the low voltage board net to the high voltage board net, to power components of the high voltage board net via the low voltage primary power supply, and
the bidirectional DC-DC converter is adapted to, in the second mode, transfer energy from the high voltage board net to the low voltage board net, to power the control unit via the high voltage traction battery.

2. The bidirectional power supply system of claim 1, wherein the measurement element includes a pulse-width modulation detector arranged at the high voltage board net, the pulse-width modulation detector being adapted to analyze a pulse-width modulation signal present on the high voltage side of the bidirectional DC-DC converter, and to detect, based on the analyzed pulse-width modulation signal, whether the low voltage primary power supply is lost.

3. The bidirectional power supply system of claim 2, wherein the pulse-width modulation detector is further adapted as a switching element that is adapted to switch operation of the bidirectional DC-DC converter to the second mode when it detects that the low voltage primary power supply is lost.

4. The bidirectional power supply system of claim 1, comprising at least one of:
at least one capacitor adapted to supply the measurement element with power, in case of loss of the low voltage primary power supply, for long enough to allow the measurement element to detect that the low voltage primary power supply is lost; or
at least one capacitor adapted to supply the switching element with power for long enough to allow the switching element to switch operation of the bidirectional DC-DC converter to the second mode.

5. The bidirectional power supply system of claim 1, comprising a control unit arranged at the low voltage board net, wherein:
the control unit is adapted to generate a pulse-width modulation signal during the first mode, and
the control unit is adapted to detect that the low voltage primary power supply is lost.

6. The bidirectional power supply system of claim 5, wherein the control unit is adapted to stop the generation of the pulse-width modulation signal at the low voltage board net when it detects that the low voltage primary power supply is lost.

7. The bidirectional power supply system of claim 1, comprising a pulse-width modulation signal generator on the high voltage board net, the pulse-width modulation signal generator being adapted to generate a pulse-width modulation signal in the second mode.

8. The bidirectional power supply system of claim 1, comprising a timer means adapted to shut down operation in the second mode after a predetermined time span.

9. The bidirectional power supply system of claim 8, wherein the timer means includes a timer circuit adapted to shut down operation in the second mode after the predetermined time span.

10. The bidirectional power supply system of claim 8, wherein the timer means includes a control unit adapted to shut down operation in the second mode after the predetermined time span via a respective control signal.

11. The bidirectional power supply system of claim 7, comprising a control element adapted to provide a cell voltage-dependent adjustment of a frequency and/or a width of the pulse-width modulation signal during the second mode.

12. The bidirectional power supply system of claim 1, comprising a current limiting means, on the low voltage board net, adapted to limit current of switching circuitry.

13. An electric vehicle, comprising the bidirectional power supply system of claim 1.

14. The electric vehicle of claim 13, wherein:
the low voltage board net and the high voltage board net are galvanically isolated via a transformer in the bidirectional DC-DC converter, and
the high voltage traction battery powers the low voltage board net in the second mode.

15. A device, comprising:
a low voltage board net that includes a control unit, the low voltage board net being adapted to supply power from a low voltage power supply to the control unit in a first mode of operation corresponding to normal operation;
a high voltage board net, the high voltage board net being configured to receive power from a high voltage power supply;
a bidirectional DC-DC converter coupled to the low voltage board net and to the high voltage board net;

a measurement element adapted to detect whether power from the low voltage power supply is lost; and a switching element adapted to switch operation of the bidirectional DC-DC converter from the first mode to a second mode of operation, in accordance with detection of a loss of the low voltage power supply, wherein:

the bidirectional DC-DC converter is adapted to, in the first mode, transfer energy from the low voltage board net to the high voltage board net, to power one or more components of the high voltage board net via the low voltage power supply, and the bidirectional DC-DC converter is adapted to, in the second mode, transfer energy from the high voltage board net to the low voltage board net, to power the control unit via the high voltage power supply.

16. The device of claim 15, wherein the measurement element includes a pulse-width modulation detector arranged at the high voltage board net, the pulse-width modulation detector being adapted to analyze a pulse-width modulation signal present on the high voltage side of the bidirectional DC-DC converter, and to detect, based on the analyzed pulse-width modulation signal, whether the low voltage primary power supply is lost.

17. The device of claim 15, comprising at least one of:
at least one capacitor adapted to supply the measurement element with power, in case of loss of the low voltage power supply, to allow the measurement element to detect that the low voltage power supply is lost; or
at least one capacitor adapted to supply the switching element with power to allow the switching element to switch operation of the bidirectional DC-DC converter to the second mode.

18. An electric vehicle, comprising:
an electric vehicle including a device, the device comprising:

a low voltage board net including a control unit, the low voltage board net being adapted to supply power from a low voltage power supply to components of the low voltage board net and to the control unit in a first mode of operation corresponding to normal operation;

a high voltage board net, the high voltage board net being configured to receive power from a high voltage power supply;

a bidirectional DC-DC converter coupled to the low voltage board net and to the high voltage board net, wherein:

the DC-DC converter is adapted to, in the first mode, transfer energy from the low voltage board net to the high voltage board net, to power one or more components of the high voltage board net via the low voltage power supply, and the DC-DC converter is adapted to, in the second mode, transfer energy from the high voltage board net to the low voltage board net, to power the control unit via the high voltage power supply;

a measurement element adapted to detect whether power from the low voltage power supply is lost; and a switching element adapted to switch operation of the bidirectional DC-DC converter from the first mode to a second mode of operation, in accordance with detection of a loss of the low voltage power supply, wherein the low voltage board net and the high voltage board net are galvanically isolated via a transformer in the bidirectional DC-DC converter, and wherein the high voltage power supply powers the low voltage board net in the second mode.

* * * * *